United States Patent [19]
Orkin

[11] 4,060,287
[45] Nov. 29, 1977

[54] BEARING SEAL AND METHOD OF FORMING SAME

[75] Inventor: Stanley S. Orkin, Rockville, Conn.

[73] Assignee: Kamatics Corporation, Bloomfield, Conn.

[21] Appl. No.: 701,739

[22] Filed: June 30, 1976

[51] Int. Cl.² .............................................. F16C 33/74
[52] U.S. Cl. ..................................................... 308/72
[58] Field of Search ........................ 308/36.1, 72, 187; 277/181, 183

[56] References Cited
U.S. PATENT DOCUMENTS

| 3,506,315 | 4/1970 | Young | 308/72 |
| 3,528,710 | 9/1970 | Roesner et al. | 308/72 |
| 3,602,560 | 8/1971 | Memmel | 308/72 X |

Primary Examiner—Robert R. Song
Assistant Examiner—Gene A. Church
Attorney, Agent, or Firm—Cushman, Darby & Cushman

[57] ABSTRACT

The disclosure embraces a method of securing sealing members in place in a bearing of the type having two relatively movable members, one being an outer bearing member having a surface that is complementary to the exterior surface of the inner bearing member; the method includes the steps of disposing the inner member inside of the outer bearing member, with the sealing members located between opposing surfaces of the inner and outer bearing members so as to maintain a space between the surfaces of the bearing members, injecting a curable mixture of a bearing surface compound in the space between the bearing members, curing the injected compound to form a bearing surface on the inner surface of the outer bearing member and to bond the sealing members in place; the disclosure also embraces a bearing member made according to the foregoing method.

3 Claims, 2 Drawing Figures

BEARING SEAL AND METHOD OF FORMING SAME

BACKGROUND AND SUMMARY OF THE INVENTION

The present invention relates to bearing seals for bearings such as the self-aligning, self-lubricating types capable of absorbing radial, axial and moment loading.

Self-lubricating and self-aligning bearings such as are disclosed in U.S. Pat. Nos. 3,806,216 and 3,904,731, both of which are assigned to the same assignee as the present invention, are used in a great number of industrial applications. Such bearing assemblies are particularly useful in environments where, once an apparatus is assembled in place for use, access to the bearing assembly is either no longer feasible or is impractical to attempt as a result of the large labor costs or production loss that would be incurred.

As is well known, one of the chief advantages of self-lubricating bearings is the fact that they can be installed in machinery and operate satisfactorily essentially over the life of the bearing without requiring periodic servicing as has been the case with bearing assemblies of the lubricated type.

In general, self-lubricating bearings are constructed with a bearing surface between the movable members of the types disclosed in U.S. Pat. No. 3,806,216. Such bearing surface compositions usually consist of a plastic material such as nylon or polytetrafluoroethylene or mixtures of compositions including phenolic impregnated glass fibrous material, phenolic-polyethylene fibrous material or a mixture of a curable acrylate composition and particulate solid lubricant. These materials, of course, do not require an auxiliary lubricating material such as refined hydrocarbons and, as a result, do not require the seals to retain the lubricant such as are disclosed in U.S. Pat. No. 2,600,434 of June 17, 1952 and 2,845,285 of July 29, 1968 and 3,243,212 of Mar. 29, 1966 and 3,873,166 of Mar. 25, 1975.

While self-lubricating bearing assemblies, by their nature, do not require seals to contain any lubricant, it has been found that for bearing surfaces that are formed from plastic materials and which are hardened for use, it is necessary to prevent ingress of contaminants and dirt between the bearing surfaces in order to prevent deterioration of the bearing surface which can result from non-uniform or uneven surface contacts. Specifically, where contaminants are disposed between the bearing surfaces, complete failure of the bearings can occur where, initially, only a small portion of the bearing surface is damaged by abrasion resulting from rubbing contact with the contaminant and the opposing bearing surface during movement of the relatively movable parts of the bearing assembly. Additionally, in certain applications of self-lubricating bearings, the bearing assemblies frequently come into contact with solvent solutions which can degrade the bearing surface over a period of time. For the foregoing and other reasons, it has become necessary to employ seals in self-lubricating bearings to maintain the physical integrity of the bearing surfaces by preventing ingress of contaminating particles and liquids between the movable bearing elements.

In previously known sealing arrangements for bearing elements of various types, rather complicated mechanical retaining assemblies have been employed so as to assure the integrity of the seal during the life of the bearing. Such retaining elements are not only costly to construct, but also time-consuming to manufacture with the precision needed to obtain the desired protection for the bearing assembly. A number of sealing arrangements have required particularly complex manufacturing methods and, thus, the costs of manufacturing the bearing assemblies have been materially increased. This is particularly true where a seal must be constructed between a stationary and movable element of the bearing assembly since the sealing element will be subjected to frictional wear as the result of movement of the bearing members.

Representative of the prior art in this field are U.S. Pat. Nos. 3,588,206, 3,873,166, 3,428,375, 3,596,533, 2,584,227, 2,277,810, 2,845,285 and 2,600,434.

The present invention provides a bearing seal and a method of constructing a bearing assembly with a bearing seal which is substantially less costly than the arrangement and methods of the prior art and yet will provide a superior seal against contaminants of either the liquid or solid type. Moreover, the method of the present invention entirely eliminates the extra manufacturing steps that have previously been necessary to construct a bearing seal since it has been discovered that the composition employed to form the bearing surface will also function to retain the seal members in place in the bearing assembly.

A significant saving in production cost is thus achieved where the composition performs a dual function of forming the self-lubricating bearing surface as well as anchoring the sealing members in place in the bearing assembly.

In a preferred embodiment, the bearing assembly of the present invention comprises inner and outer co-engaging bearing members which are movable relative to one another. The inner bearing member has a bearing surface made of a member selected from a group consisting of metal and ceramic while the outer bearing surface is produced from a mixture of a curable acrylate composition and a solid lubricant, organic or inorganic, in particulate form. As discussed in U.S. Pat. No. 3,904,731, the curable acrylate is present in amounts of about 50–70, preferably about 60 percent by weight of the mixture, the remainder being essentially a particulate solid lubricant which can be, for example, polytetrafluoroethylene, preferably in flock form, molybdenum disulfide, graphite fibers, silver powder, lead powder, fiberglass flock and others. The specific chemical composition of the acrylate compound should be as disclosed in U.S. Pat. Nos. 3,904,731 and 3,806,216, the disclosures of which are incorporated herein by reference.

In carrying out the method of the present invention, the inner bearing member is placed within the outer bearing member and held in position by sealing members in the form of rings, which may be made from compressible, resilient material. The sealing rings perform the dual functions of spacing the outer bearing members a preselected distance from the exterior surface of the inner bearing member and trapping the moldable composition during its injection between the bearing members.

With the sealing rings in place, the bearing surface composition can be injected into the space between the bearing members to fill the space and contact the sealing rings. The composition is then cured to form the bearing surface and to bind the sealing rings in place. By use of a parting agent which is coated on the exterior surface of the inner member, prior to injection of the bearing surface mixture, any adhesion between the inner bearing member and the bearing surface composition will be prevented. Representative of such parting agents are polytetrafluoroethylene, silicone, a wax emulsion and the like.

The moldable composition of the outer bearing surface can be injected into the spacing between the inner bearing member and the outer housing member at a significantly lower pressure than heretofore considered permissible. Thus, pressures as low as about 0.25 psi to 50 psi can be employed. Further, the moldable outer bearing composition of the present invention is sufficiently flowable at ambient temperature that its injection at the stated low pressures can be effected at ambient temperature, thereby eliminating the need for extraneous heating devices and controls to maintain the composition in a state suitable for injection at these low pressures. Of course, higher pressures may be employed where desired.

After injection, the moldable outer bearing member is then cured according to any of the procedures disclosed in U.S. Pat. No. 3,904,731. In curing the compound, the sealing members in contact therewith will be physically bonded in place in the assembly and will prevent both outflow of the composition and ingress of contaminants between the exterior surface of the inner bearing member and the surface of the bearing composition which defines the bearing surface of the outer bearing member. As a result, the physical integrity of the opposing bearing surfaces will be maintained at a higher degree of cleanliness throughout the life of the bearing assembly.

The foregoing and other advantages will become apparent as consideration is given to the following detailed description of the invention and accompanying drawings, in which:

DETAILED DESCRIPTION OF THE INVENTION

Figure 1:
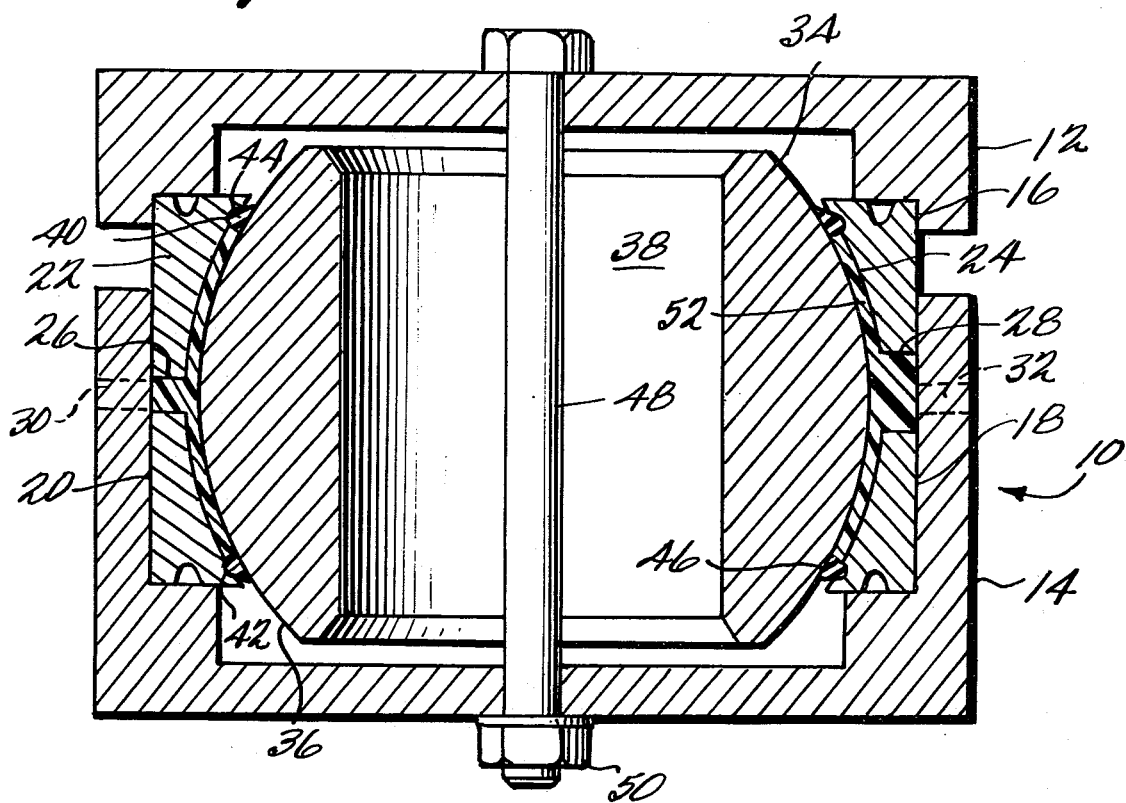
FIG. 1 is a sectional view illustrating the placement of the parts in a mold cavity to produce the bearing assembly of this invention.

In FIG. 1, there is illustrated a housing generally designated at 10 which includes upper and lower members 12 and 14 respectively. Members 12 and 14 are both provided with annular recesses 16 and 18 respectively for receiving the external surface 20 of the outer bearing member 22 which is of annular shape. The inner surface 24 of the outer bearing member 22 is also annularly shaped and concavely curved as illustrated in FIG. 1.

Approximately at its midpoint relative to its central axis of symmetry, outer bearing member 22 is provided with filling and vent orifices 26 and 28, respectively, which are disposed on opposite sides of bearing member 22. Lower member 14 of the housing 10 is also provided with filling and vent orifices 30 and 32 which are positioned so as to be alignable with the orifices 26 and 28 of the outer bearing member 22.

The inner bearing member 34 is in the form of a truncated ball having a smooth exterior surface 36. The interior surface 38 is in the form of a cylindrical bore.

Bearing member 34 may be made from metal such as titanium or metal alloys such as stainless steel, aluminum or other compositions, or a ceramic composition in the form of a coating on a metal substrate while the outer bearing member 22 may be made of a metal of high tensile strength such as titanium, titanium-based alloy or stainless steel or an aluminum alloy as well as other well-known metals and metal alloys.

In carrying out the method of the present invention, the exterior surface 36 of the inner bearing member 34 is coated with a thin film of a parting or release agent as described above. The outer bearing member 22 is preferably provided with a pair of annular grooves as at 40 and 42 about the circumference of its interior surface 24. Bearing seals in the form of resiliently compressible O-rings 44 and 46 are disposed in grooves 40 and 42 respectively. The bearing member 34 may be disposed inside of the outer bearing member 22 by any of the conventional means such as by splitting bearing member 22, inserting the bearing member 34 and then welding bearing member 22 or by deforming member 22 to a slight extent to close it about the bearing member 34. In some instances, the clearance between the surfaces of the two bearing members 22 and 34 will be sufficient prior to the injection of the molding composition to permit free insertion of bearing member 34. The bearing seal rings 44 and 46 function to center inner bearing member 34 relative to the interior surface 24 of the outer bearing member 22 to provide a clearance between the surfaces 36 and 24.

The two bearing members 22 and 34 with the bearing seals 44 and 46 in place are then placed in housing 10 as illustrated in FIG. 1. A bolt 48 may be employed to hold the upper member 12 in tight engagement with the external surface of the outer bearing member 22. The bolt may be tightened by a nut 50 to lock the housing into its closed position.

As previously mentioned, however, the surface 36 should be first coated with a thin film of a parting agent such as described above. To form the outer bearing surface 52, a flowable mixture of curable acrylate composition and particulate solid lubricant is injected under relatively slight pressure at ambient temperature through the aligned filling orifices 30 and 26 to fill the clearance between the surfaces 24 and 36 and to come into contact with the interior surfaces of the bearing seals 44 and 46 which trap the mixture between the bearing members.

The mixture can be injected into the clearance or cavity by means of a syringe and its introduction is continued until it is visibly ejected through the vent orifices 28 and 32. The acrylate composition is then cured either (1) by placing the total mold assembly into an enclosure maintained with an essentially oxygen gas-free environment and at a temperature ranging from ambient temperature to 325° F, for a period ranging from about ¼ to 24 hours, or (2) by placing the mold assembly in an enclosure maintained with an oxygen-containing gas environment and at a temperature ranging from about 100° to 325° F, for a period ranging from about a ¼ to 2 hours.

Curing of the bearing composition will effect a physical bonding of the bearing seals 44 and 46 to the hardened mixture to hold the bearing seals in place. As illustrated, the bearing seals 44 and 46 are in their compressed condition so as to provide a superior seal against the ingress of contaminants.

Figure 2:
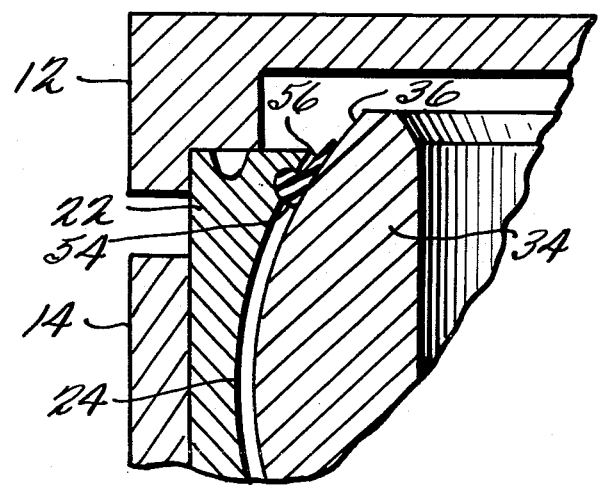
FIG. 2 is a sectional view with parts broken away, illustrating an alternate type of bearing seal.

As shown in FIG. 2, an alternate type of bearing seal 54 may usefully be employed in the arrangement of this invention. Seal 54 differs from the O-rings of the embodiment of FIG. 1 in that a laterally extending flange 56 is provided which extends externally of the cavity defined by the surfaces 36 and 24 and provides an extended barrier against the ingress of contaminants. The side of the seal 54 remote from the flange 56, of course, will be bonded to the moldable bearing surface composition upon curing of the composition.

The bearing seals 44 and 46 may be made from tetrafluoroethylene fluorocarbon, fluoroelastomers based on the copolymer vinylidene fluoride and hexafluoropropylene, sold under the trademark "Viton", silicone, buna N rubber, nylon, polyester and combinations of these materials together with metals such as beryllium copper alloys and stainless steel in the form of very thin reinforcement layers, such as, for example, on the order of 0.001 inches in thickness. The seal rings may have a round configuration as well as square in cross section in the first embodiment as well as the main body of the bearing seals of the second embodiment.

What is claimed is:

1. A bearing assembly comprising:
   an outer bearing member having an inner surface,
   an inner bearing member having an exterior surface shaped complementarily with respect to said inner surface of said outer bearing member, said inner and outer bearing members being movable relative to one another,
   sealing members disposed between and in contact with said inner surface of said outer bearing member and said exterior surface of said inner bearing member,
   said inner surface of said outer bearing member having means for retaining said sealing members in place, said retaining means including a bearing surface coating on said interior surface, said coating comprising a cured mixtue of an acrylate composition and a particulate solid lubricant which is adhered to at least a portion of said sealing members.

2. The bearing assembly as claimed in claim 1 wherein said inner surface is annular in shape and symmetrical about a central axis and said sealing members are two resilient rings of predetermined radial thickness, said retaining means further including two grooves formed in said inner surfaces of said outer bearing member and spaced apart relative to said central axis, the depth of said grooves being less than said predetermined radial thickness of said rings, each said ring being disposed in a said groove with a portion of each said ring protruding from its said groove.

3. The bearing assembly as claimed in claim 2 wherein said rings each have a rib portion extending therefrom on a side portion of each ring generally opposite to the side portion to which said coating is adhered, said rib portion of each ring lying against said exterior surface of said inner bearing member.

* * * * *